Figure 1:
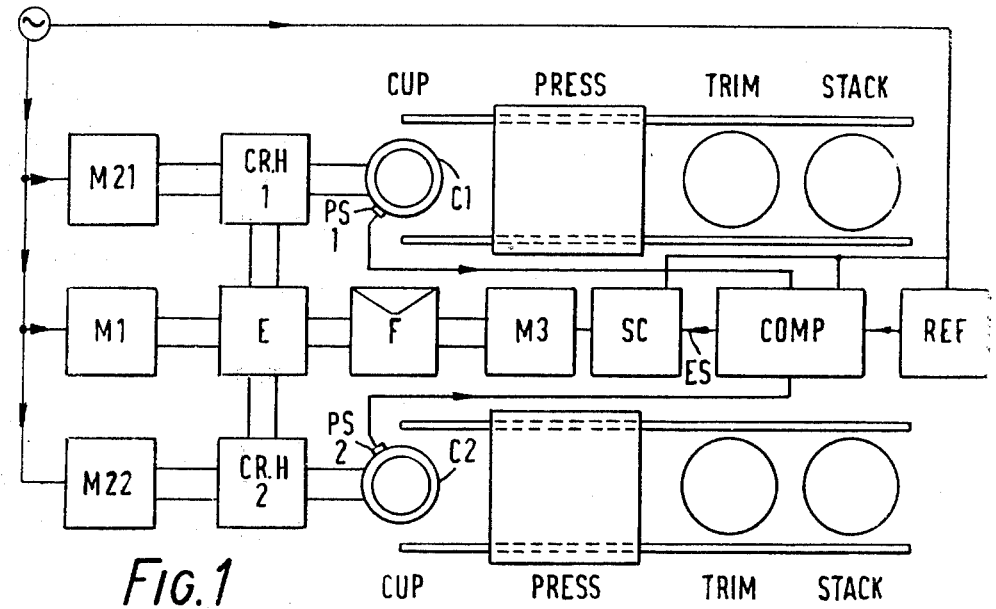

United States Patent [19]

Strausfeld et al.

[11] 4,249,876
[45] Feb. 10, 1981

[54] CONTROL OF PLASTICS EXTRUSION

[75] Inventors: Hermann Strausfeld; Herbert Schloesser; Dietmar Dehn, all of Cologne, Fed. Rep. of Germany

[73] Assignee: EMI Electrola Gesellschaft mit beschrankter Haftung, Cologne Braunsfeld, Fed. Rep. of Germany

[21] Appl. No.: 37,870

[22] Filed: May 10, 1979

[30] Foreign Application Priority Data

May 20, 1978 [GB] United Kingdom ............... 20938/78

[51] Int. Cl.³ ........................... B29B 5/04; B29B 5/06
[52] U.S. Cl. ................................... 425/145; 264/40.4; 264/10.7; 425/147; 425/159; 425/325; 425/406; 425/810
[58] Field of Search ............... 425/145, 147, 159, 140, 425/155, 157, 406, 325, 810, 397; 264/40.7, 40.4, 106, 107

[56] References Cited

U.S. PATENT DOCUMENTS

| 3,216,061 | 11/1965 | Schott, Jr. .................... 425/159 |
| 3,243,848 | 4/1966 | Miller et al. .................. 425/145 |
| 3,906,065 | 9/1975 | Schneider et al. ............. 264/40.7 |

FOREIGN PATENT DOCUMENTS

| 1396504 | 6/1975 | United Kingdom . |
| 1459673 | 12/1976 | United Kingdom . |
| 1486883 | 9/1977 | United Kingdom . |
| 1498801 | 1/1978 | United Kingdom . |

Primary Examiner—Jeffery R. Thurlow
Attorney, Agent, or Firm—Fleit & Jacobson

[57] ABSTRACT

An extruder control arrangement in which the time taken to deliver a known quantity of extrudate is maintained within closely controlled limits by feedback circuit which controls the rate at which plastics material is fed to the extruder.

5 Claims, 2 Drawing Figures

CONTROL OF PLASTICS EXTRUSION

This invention relates to the extrusion of plastics materials and in particular to the extrusion of plastics materials used in the production of plastics mouldings—disc records, for example.

In the production of plastics mouldings such as disc records, it is desirable to extrude a constant volume, or "shot", of plastics material, which is then passed to the moulding stage, and to this end techniques have been developed (British Pat. No. 1,396,504) in which the amount of material supplied is controlled by the operation of a microswitch on the filling of a container with the extrudate.

For an efficient moulding cycle, however, it is desirable to complete the extrusion of a "shot" in register with the completion of the pressing and cooling of the previously formed "shot", and this is a particularly important consideration when a single extruder is used to feed two presses operating in antiphase. It is the pressing and cooling cycle which sets the optimum time for extrusion and if a deviation from this time should occur then either a defective "shot" may be formed having incorrect properties of mouldability and/or the pressing cycle may have to be delayed if the extrusion time is too long.

The material fed to the extruder may not be of a uniform consistency, and may, for example, contain degraded material retrieved from a previous moulding cycle, and in consequence the feed rate (i.e. weight delivered in a given time) and so the viscosity of the extrudate and the extrusion rate may vary.

It is an object of the present invention to provide an improved form of extruder control.

According to one aspect of the invention there is provided an extruder control arrangement comprising,
a feeder means having an adjustable feed rate for supplying a thermoplastics material to an extruder,
means for generating a reference signal indicative of a preset time period, sensing means for determining the actual time period for the extruder to deliver a measured quantity of extrudate and for generating a further signal indicative thereof,
means responsive to said reference and further signals for comparing said preset and actual time periods and for regulating the feed rate of the feeder means in dependence on the comparison, the feed rate being increased or decreased when the actual time period is respectively greater than or less than the preset time period.

According to another aspect of the invention there is provided an extruder control arrangement comprising,
a feeder means having an adjustable feed rate for supplying a thermoplastics material to an extruder,
means for generating a reference signal indicative of two preset time periods,
sensing means for determining the actual time period for the extruder to deliver a measured quantity of extrudate and for generating a further signal indicative thereof,
means responsive to said reference and further signals for comparing said preset and actual time periods and for regulating the feed rate of the feeder means in dependence on the comparison, the feed rate being increased only when the actual time period is greater than the larger of said preset times periods and being decreased only when the actual time period is less than the smaller of said preset time periods.

Preferably the measured quantity of material may be a fixed volume or mass. It will be appreciated that the measured quantity of material may be measured either directly or indirectly by, for example, the determination of a desired length of extrudate having a known cross-sectional area.

The feed rate of the feeder means may be increased or decreased by a fixed amount.

According to another aspect of the invention there is provided a disc record press including an extruder control arrangement as hereinbefore described.

Figure 2:
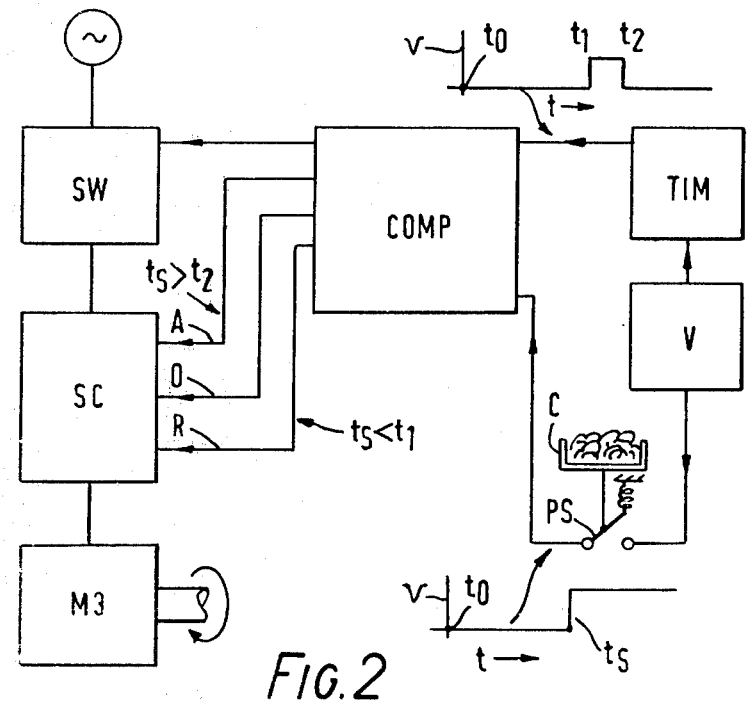

Embodiments of the invention will now be described with reference to the accompanying drawings of which:

FIG. 1 shows a block schematic diagram of the invention applied to control a disc record press extruder, and FIG. 2 shows details of the control arrangement of FIG. 1.

A typical disc record press includes four stations in a process path linked by a three station transfer means, a reciprocatable sled, for example, to move the shot extruded into cup C with labels attached, to a press station, a trimming station and stacking station, to produce a finished disc.

Conventionally (British Pat. No. 1,396,504) to control the amount of material extruded, an extruder is started by a control and is stopped by a microswitch mounted in a shot forming cup, which switch is responsive to the rise in pressure when the extruded material fills the cup.

However, due to non-uniformity in the properites and/or the physical form (e.g. the packing density) of the plastics material fed to the extruder the properties of the extrudate e.g. its viscosity and so the time taken to fill the cup may vary, and the present invention provides a control arrangement whereby this variation is reduced.

The "shot" material may be derived from granules, powder or even from degraded waste material retrieved from a previous moulding cycle. This plastics material is supplied, by a pneumatic conveyor, for example, to the feeder portion, F, of a multistage extruder arrangement. In part, F, of arrangement the materials are conveyed and may also to some extent be mixed and softened by a feeder screw driven by electric motor, M3, whose speed is controllable in a manner to be described later. In this part of the apparatus it is generally true that a constant volume rather than a constant weight of material is conveyed for any given screw speed. The feeder screw transfers the material to the main extruder screws which are comprised in part, E, of the arrangement, and these screws are driven by a fixed speed electric motor, M1, to supply material to cross head feed screws. In the illustrated embodiment the extruder supplies two presses which are preferably arranged to work in antiphase, that is only one press receives material from the extruder at a time. This is similar to the arrangement described in our British Specification No. 1,498,801. In such an arrangement two cross heads CRH1, CRH2 are used but clearly for a single press only one cross head is necessary. Whichever arrangement is used the cross heads are driven by respective fixed speed electric motors M21, M22 to extrude the material into the respective cups C1, C2. The rate of extrusion, however, is controlled by the rate at which a given mass of plastics material is supplied to part E which in turn is influenced by the speed of the motor, M3, driving the feeder screw. The other screws are driven at a constant speed, sufficient to always transfer material received from the feeder portion, F, to the cups. Suitable control arrangements, not shown, are provided to ensure that the appropriate cup is fed with material by the appropriate action of a crosshead when required.

The arrangement, shown in FIG. 1, for controlling the speed of motor, M3, requires the determination of the time elapsing for the extruder to fill a cup.

As described above a microswitch, PS1 or PS2, in FIG. 1, responds when the appropriate cup C1 or C2, is full of material, to stop the supply of extruded material. This response is also used to determine the time elapsing to fill the cup. This time is then compared, in comparator, COMP, with a reference time supplied by a source, REF. Any significant difference between the reference time and the actual elapsed time generates an error signal ES which is applied to a speed control unit, SC, to adjust the speed of the motor, M3, to reduce the error signal. As mentioned above changes in the properties of the material supplied to the extruder portion, E, can alter the time taken to fill the cup.

By altering the speed of the drive to the feeder portion, F, allowance can be made for such changes and so the extrusion rate may be held constant, within the limits set by the comparator.

FIG. 2 shows in more detail a block schematic diagram of one form of the arrangement in FIG. 1. The reference signal is generated by a timer TIM which, after a set time $t_1$ from the start of extrusion, generates a parameter value gate pulse of duration $t_1$ to $t_2$, from voltage source V, which is applied to one input of comparator COMP. The operation of the respective microswitch PS1 or PS2 on the filling of a cup at time $t_s$ connects voltage source V to another input of comparator COMP. So long as the transition at $t_s$ occurs within the duration of pulse $t_1$ to $t_2$ the comparator COMP maintains a signal on line 0, to speed control SC, to keep the speed of motor M3 constant. When $t_s$ occurs after interval $t_1$ to $t_2$ a signal is applied on line A to speed control SC to advance the speed of motor M3. When $t_s$ occurs before interval $t_1$ to $t_2$, a signal is applied to line R to retard the speed of motor M3. Switch SW is used to start and stop the motor M3 as required.

Preferably the speed of motor M3 is adjusted in steps, one step for each extrusion cycle. In one arrangement time $t_0$ to $t_1$ is ten seconds for a 155 gram "shot" and the interval set by pulse $t_1$ to $t_2$ is 0.5 seconds. The nominal speed of motor M3 is 1450 r.p.m. with constant torque, while the speed is variable in steps of 25 r.p.m. For example, in one extruder, if the material supplied to the extruder is changed from powder to granules a speed change of some 125 r.p.m. at constant torque is needed to maintain a constant extrusion rate and such a change can be brought about automatically by the action of an apparatus embodying the invention within five extrusion cycles.

Suitable control circuit elements for incorporation in unit SC to adjust motor speed at constant torque are well known and will not be described in detail. Similarly suitable circuit arrangements for the comparator reference generator and timer are readily apparent to those skilled in the art and will not be described in detail.

The arrangement described above is advantageous in maintaining a constant extrusion rate thereby improving the performance of the extruder when the nature of the supply material varies, and because the viscosity of the extrudate is maintained at a constant value, a material having uniform properties of mouldability is produced.

The invention is particularly advantageous in the arrangement whereby one extruder is used to feed two presses operating in antiphase. Since the time for each extrusion is maintained within carefully controlled limits in fixed relationship to each pressing and cooling cycle (e.g. the extrusion time may be exactly half the pressing and cooling cycle time), it is not necessary to stop and start the main extruder screws after each extrusion. Consequently the homogeneity of the extruded material is enhanced and the amount of material wasted when one of the presses has to be stopped for any reason is minimised. Furthermore, the life-time of the extruder, in particular the gear box and the axial bearings for the screws, is substantially increased and this, of course, also reduces the down time of the press.

Clearly, although the above description relates specifically to the moulding of plastics discs, the invention could also be applied to other plastics moulding procedures.

What we claim is:

1. An extruder control arrangement comprising,
   a feeder means having an adjustable feed rate for supplying a thermoplastics material to an extruder,
   means for generating a reference signal indicative of a preset time period, sensing means for determining the actual time period for the extruder to deliver a measured quantity of extrudate and for generating a further signal indicative thereof,
   means responsive to said reference and further signals for comparing said preset and actual time periods and for regulating the feed rate of the feeder means in dependence on the comparison, the feed rate being increased or decreased when the actual time period is respectively greater than or less than the preset time period.

2. An extruder control arrangement comprising,
   a feeder means having an adjustable feed rate for supplying a thermoplastics material to an extruder,
   means for generating a reference signal indicative of two preset time periods,
   sensing means for determining the actual time period for the extruder to deliver a measured quantity of extrudate and for generating a further signal indicative thereof;
   means responsive to said reference and further signals for comparing said preset and actual time periods and for regulating the feed rate of the feeder means in dependence on the comparison, the feed rate being increased only when the actual time period is greater than the larger of said preset times periods and being decreased only when the actual time period is less than the smaller of said preset time periods.

3. An extruder control arrangement according to claim 1 or 2 wherein the measured quantity of material is a fixed volume or mass.

4. An extruder control arrangement according to claim 1 or 2 wherein the feed rate of said feeder means is increased or decreased by a fixed amount.

5. A disc record press including an extruder control arrangement according to claim 1 or 2.

* * * * *